United States Patent [19]

dePolo

[11] E Re. 30,833

[45] Reissued Dec. 29, 1981

[54] GARMENTS FORMED OF HELICALLY JOINED PIECES

[76] Inventor: Harry R. dePolo, 480 Park Ave., New York, N.Y. 10021

[21] Appl. No.: 165,365

[22] Filed: Jul. 2, 1980

Related U.S. Patent Documents

Reissue of:

[64] Patent No.: 4,097,933
Issued: Jul. 4, 1978
Appl. No.: 770,034
Filed: Feb. 18, 1977

[51] Int. Cl.[3] ..... A41D 1/18
[52] U.S. Cl. ..... 2/105; 2/74
[58] Field of Search ..... 2/105, 74

[56] References Cited

U.S. PATENT DOCUMENTS

| | | | |
|---|---|---|---|
| 608,529 | 10/1900 | Johnson | 2/175 |
| 3,154,792 | 11/1964 | Lobel | 2/211 |
| 3,396,406 | 8/1968 | Gongwer | 2/2.1 R |

*Primary Examiner*—Doris L. Troutman
*Attorney, Agent, or Firm*—Robert E. Burns; Emmanuel J. Lobato; Bruce L. Adams

[57] ABSTRACT

A dress-type garment is formed of one or more strips of fabrics wound helically about the torso of the wearer and having contiguous edges of adjacent convolutions joined by helical seams. A pants-type garment is similarly formed by strips helically wound to form the legs, with upper end portions of the strips cut and joined by a central seam to form the upper portion of the pants. Another embodiment of a dress-type garment is made of first, second and third squares with two adjacent edges of the second square joined to two adjacent edges of the first square and the other two edges of the second square joined to two adjacent edges of the third square.

20 Claims, 31 Drawing Figures

FIG. 1
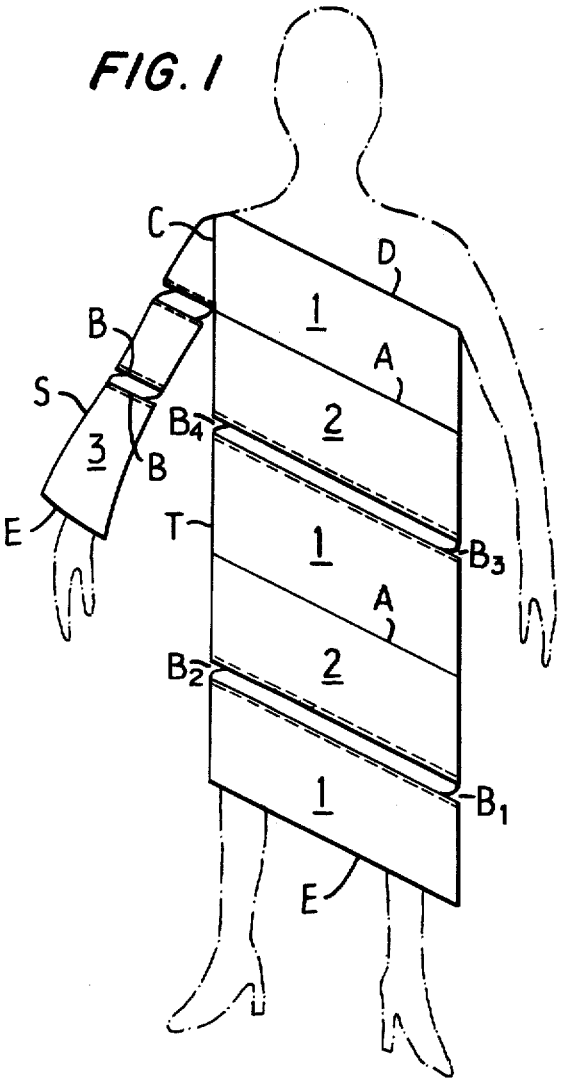
FIG. 3
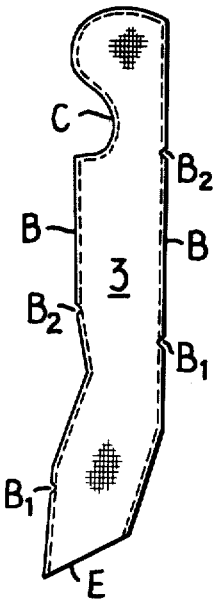
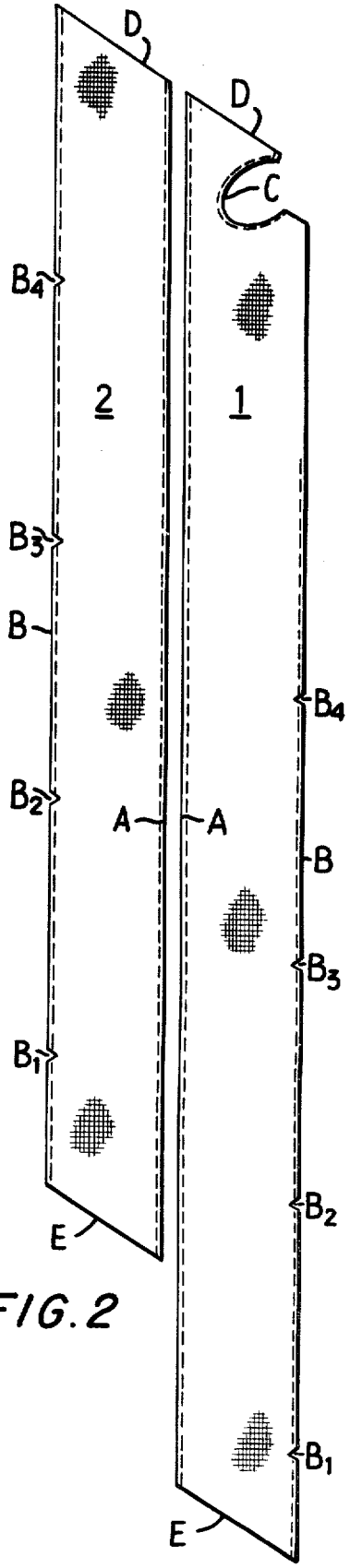
FIG. 2

FIG.4
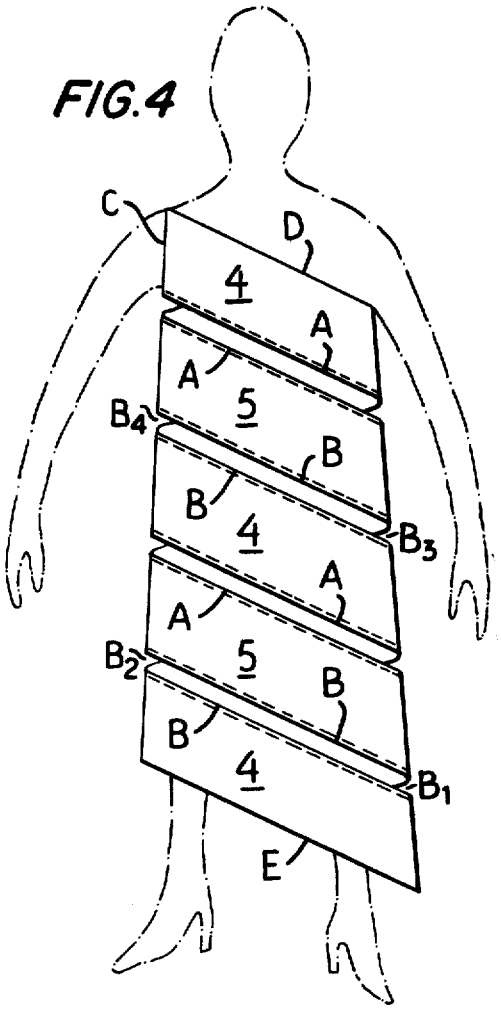
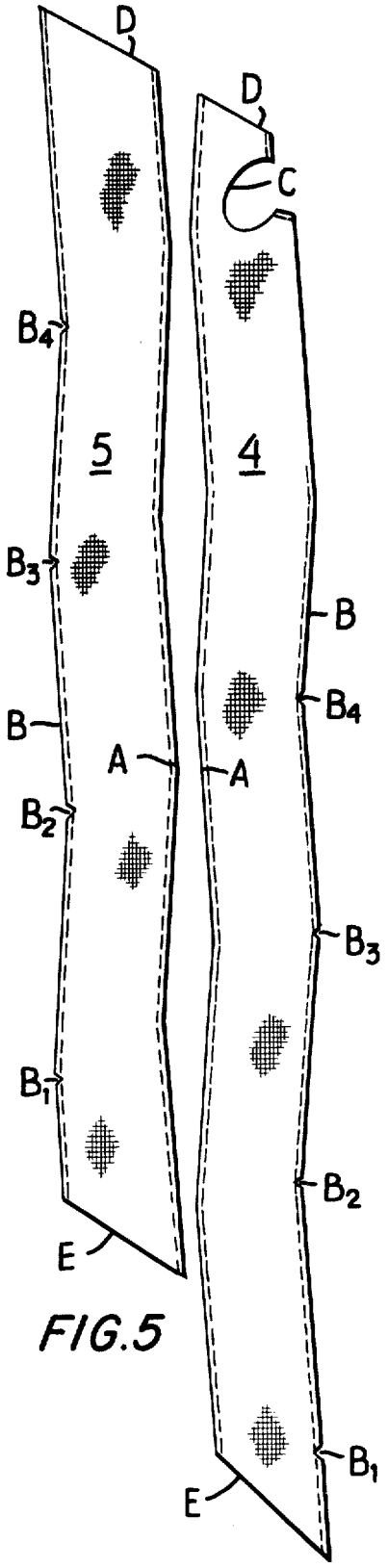
FIG.5

FIG. 6
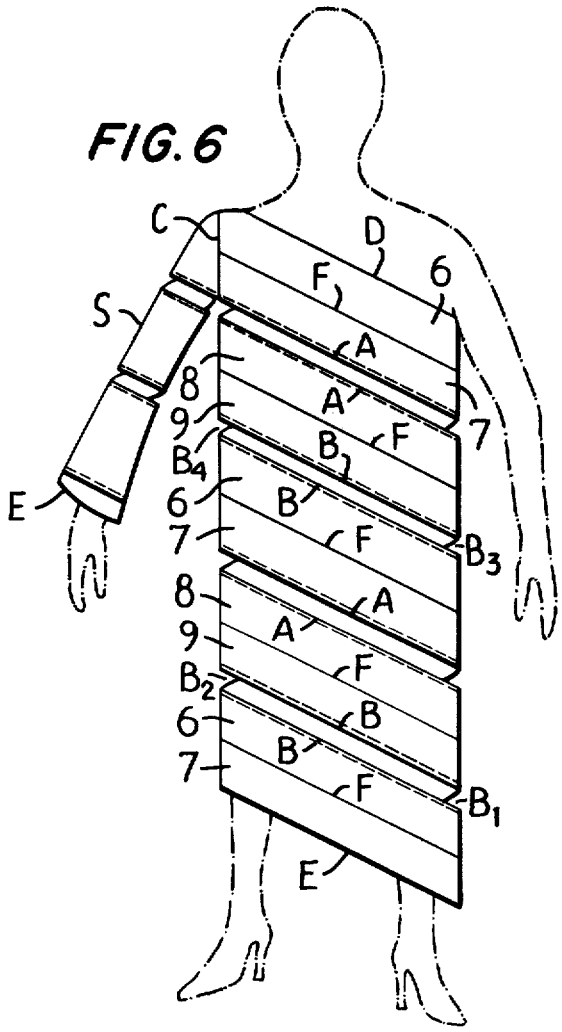
FIG. 8
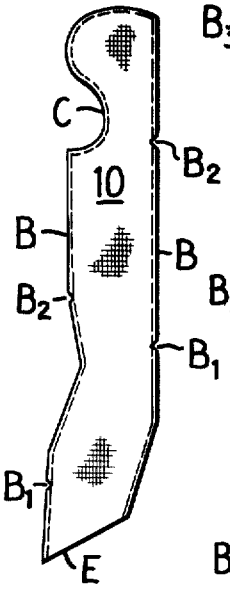
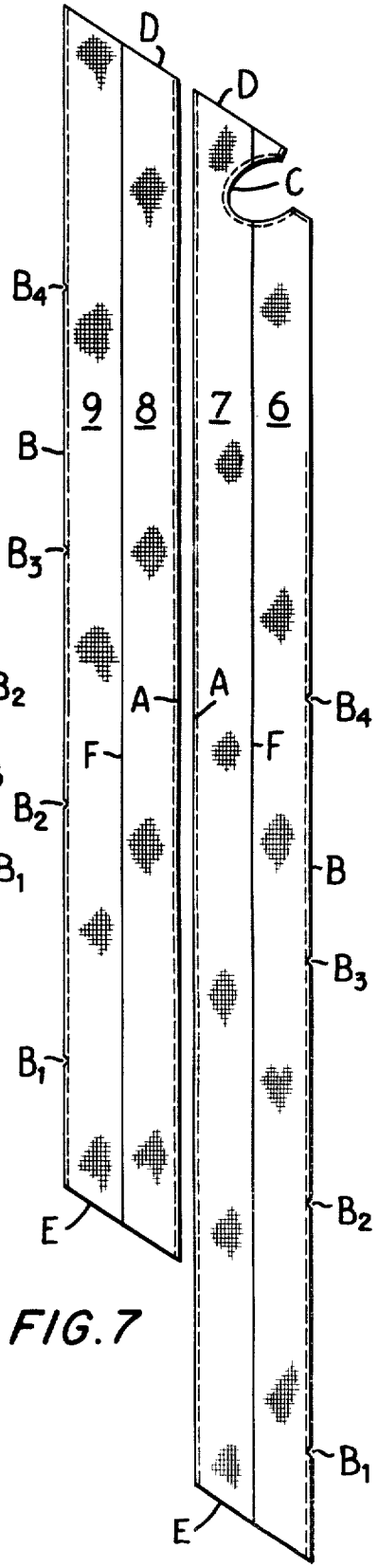
FIG. 7

FIG.9
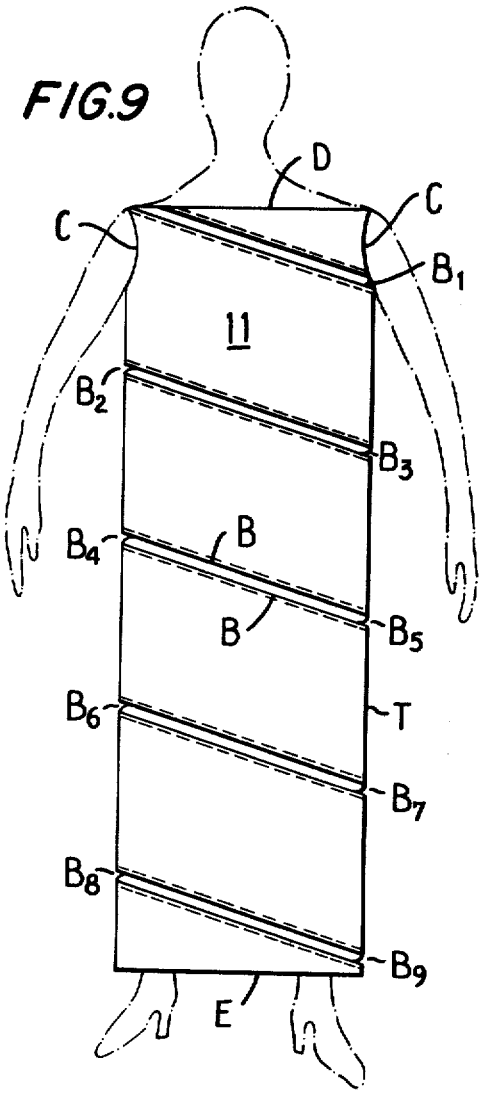
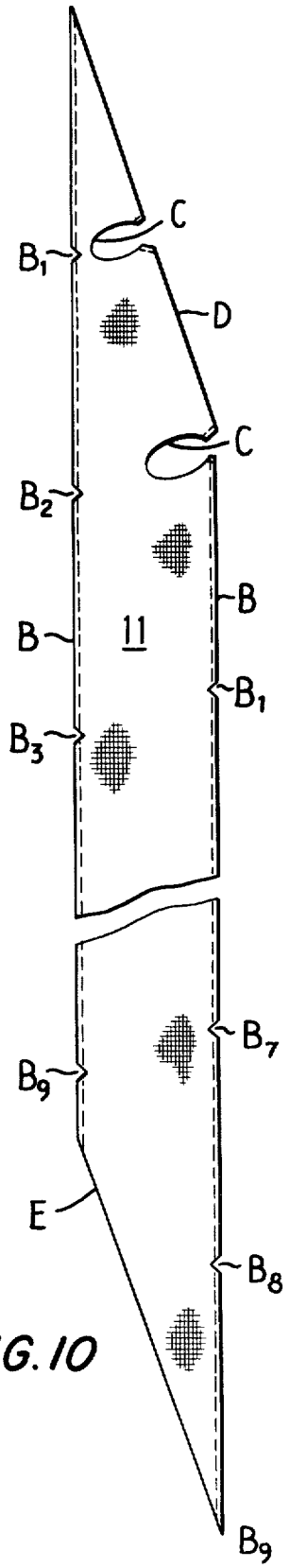
FIG.10

FIG. 11
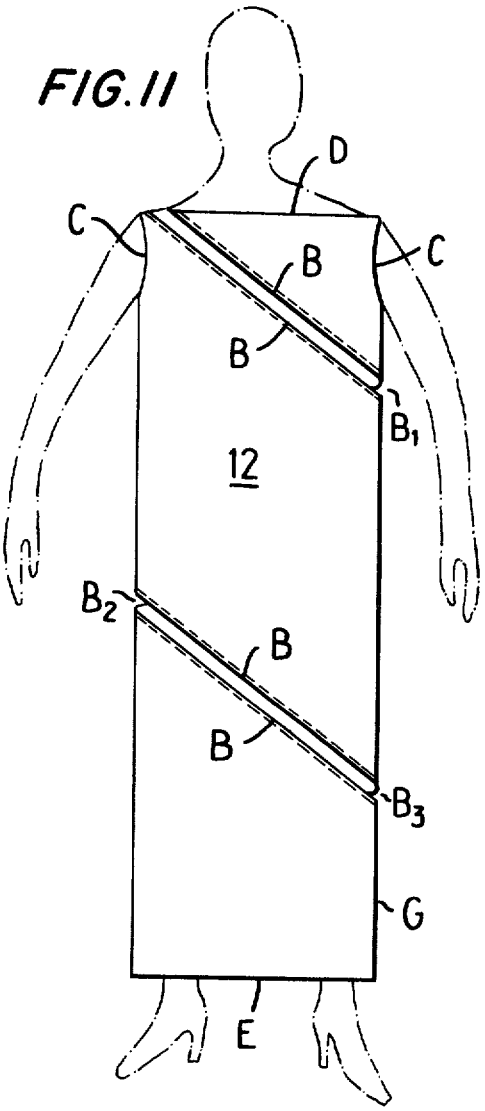
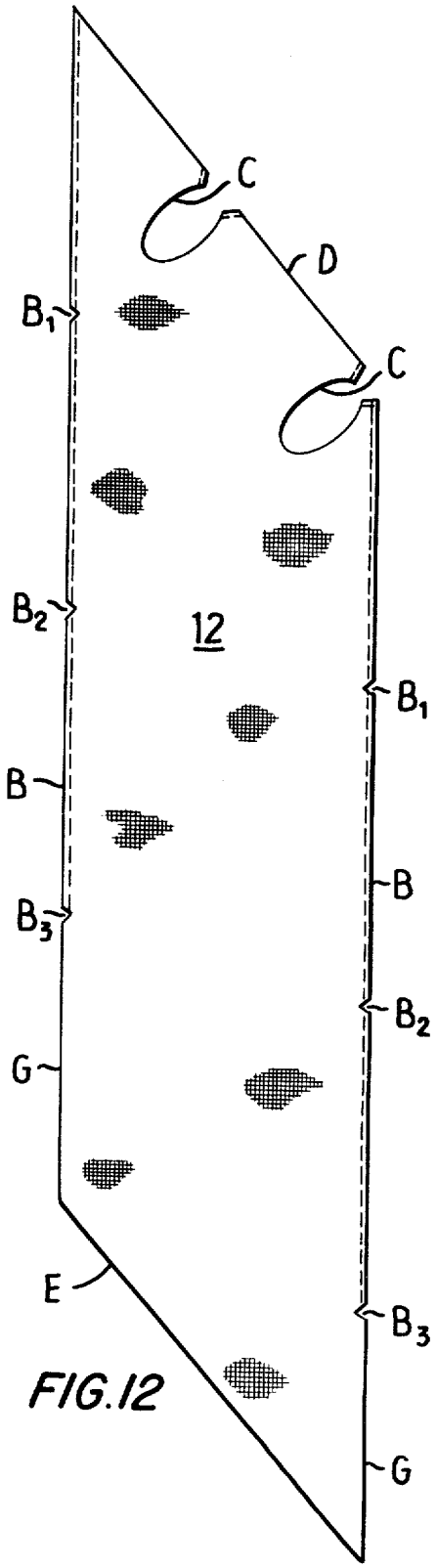
FIG. 12

FIG.20
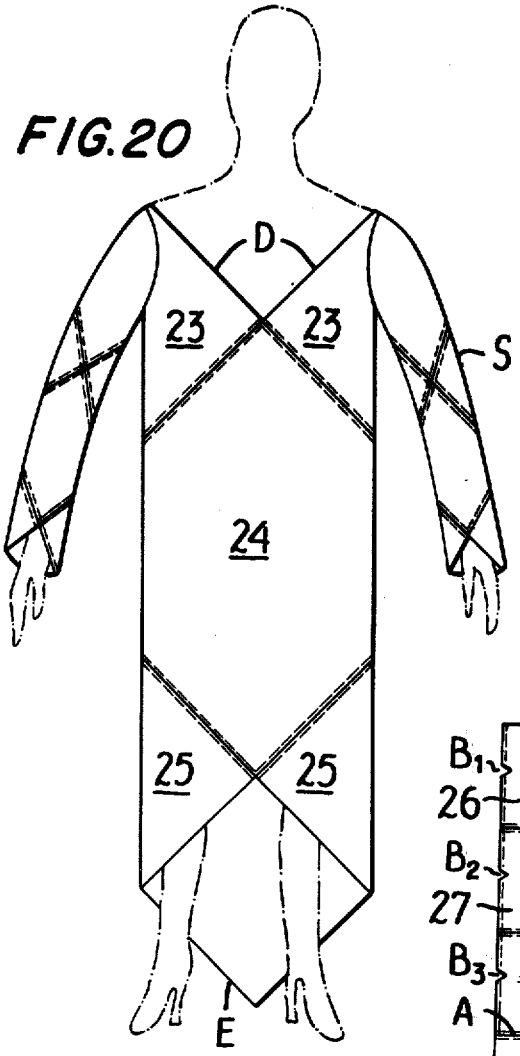
FIG.21
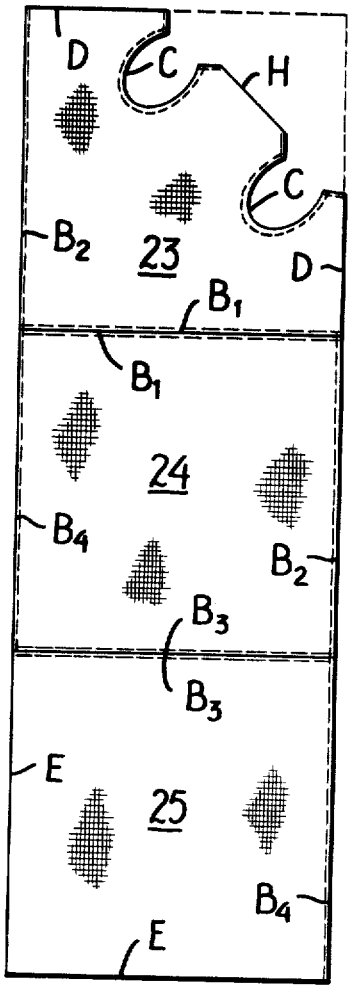
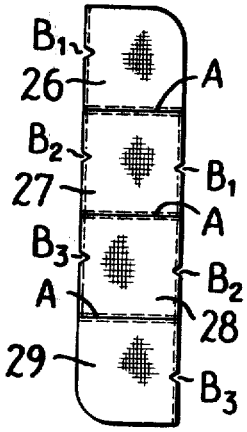
FIG.22

FIG. 23
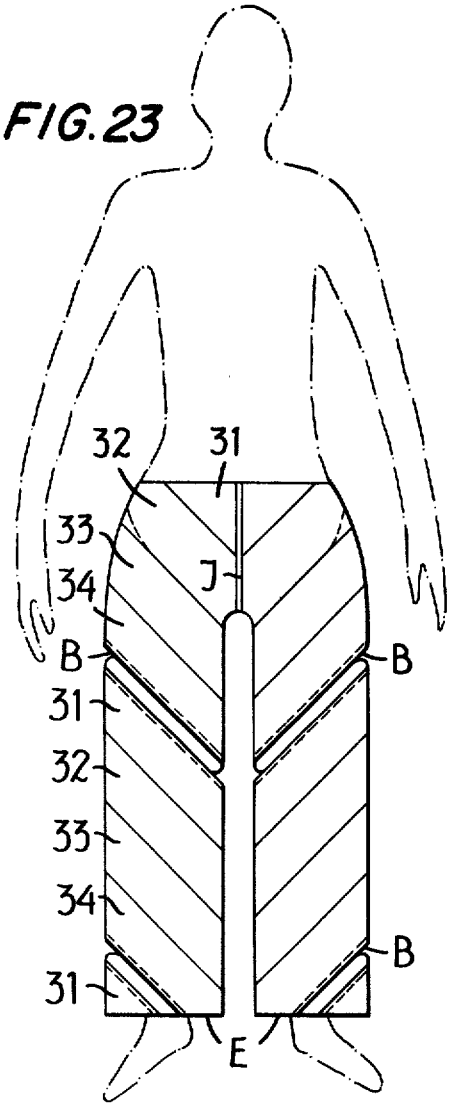
FIG. 24A
FIG. 24B
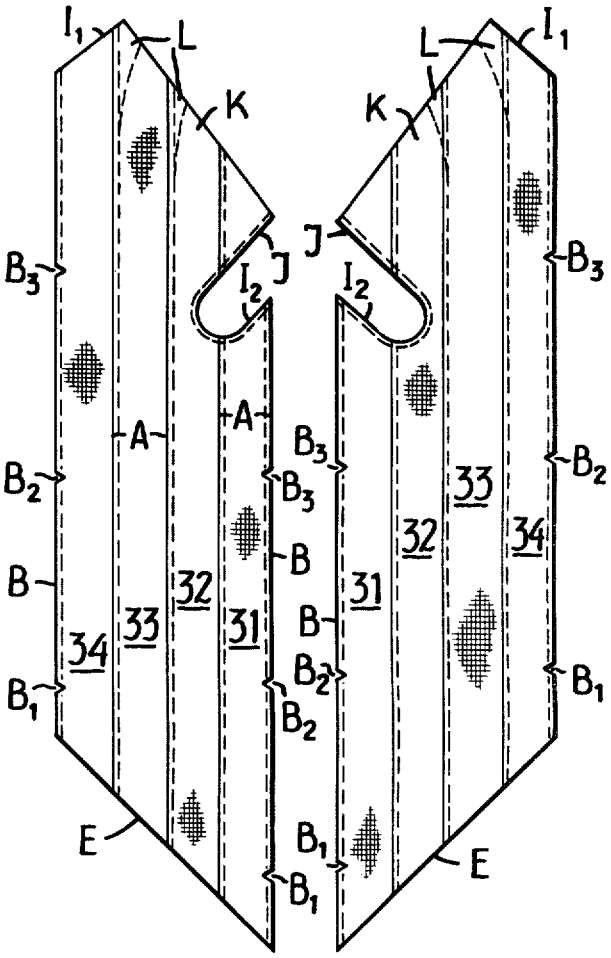

FIG. 25
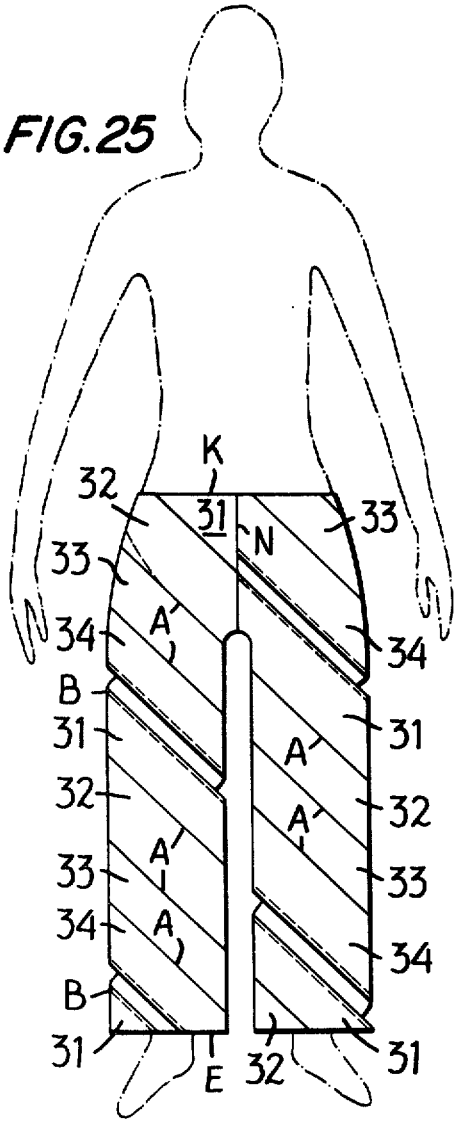
FIG. 26A
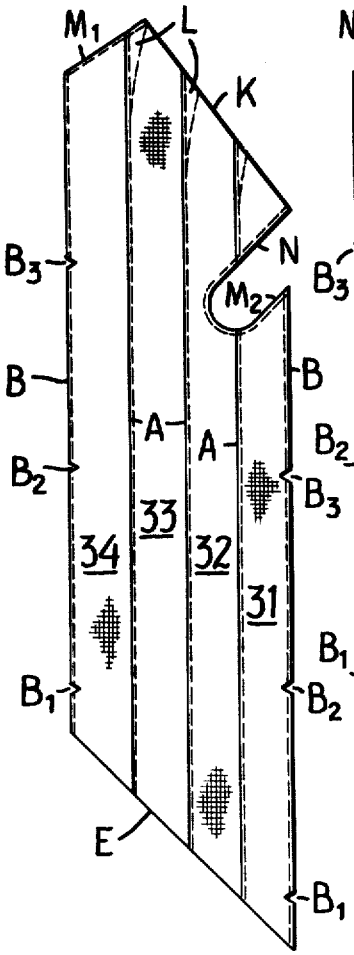
FIG. 26B
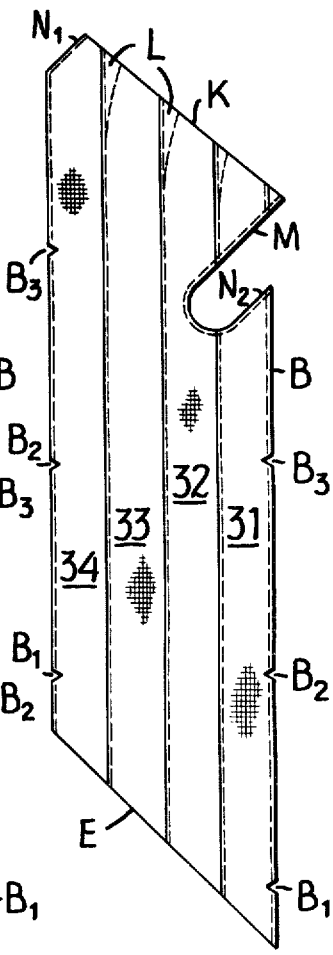
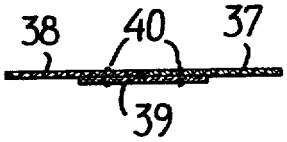
FIG. 28
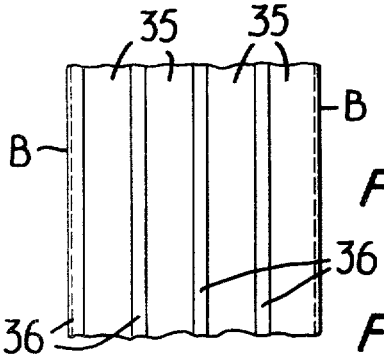
FIG. 27
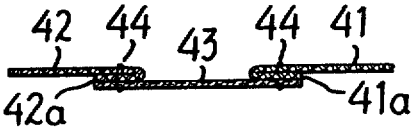
FIG. 29

GARMENTS FORMED OF HELICALLY JOINED PIECES

Matter enclosed in heavy brackets [ ] appears in the original patent but forms no part of this reissue specification; matter printed in italics indicates the additions made by reissue.

FIELD OF THE INVENTION

The present invention relates to the construction of dress-type garments and pants-type garments. The term "dress-type garment" is used broadly to include dresses, slips, blouses, coats, jackets, nightgowns, hostess coats, skirts and other sheath-type garments for covering or partially covering the torso and in some cases the legs of a wearer. The term "pants-type garment" is used broadly to include pants, slack, jeans, coulottes and similar garments for covering the lower portion of the torso and individually covering the legs of a wearer.

BACKGROUND OF INVENTION

Dress-type garments and pants-type garments have heretofore been made by using a pattern to cut pieces of various sizes and shapes from fabric material and then sewing the pieces together. Frequently it is necessary to use pleats, darts, shirring or gathering in order to obtain a garment of the desired shape. As considerable skill and experience is required, a relatively small portion of individuals are capable of making their own clothes. By reason of the time, skill and labor involved it has become more and more expensive to have clothes made by a professional dressmaker. Even by mass production methods the labor involved in cutting and assembling garments made by conventional methods has increased the cost of "ready made" clothes.

SUMMARY OF INVENTION

It is an object of the present invention to overcome the disadvantages of the prior art by providing a novel type of construction which greatly simplifies the work involved in making a garment. Instead of being formed of numerous pieces of fabric cut according to pattern and then sewn together, a garment in accordance with the present invention is formed of one or more long strips wound in a helical manner about the torso of the wearer and joined by one or more seam lines which likewise extend in a helical manner. The construction in accordance with the present invention thus simplifies not only the cutting of the fabric but also its assembly into a garment. In its simplest form a garment in accordance with the present invention (apart from any sleeves or trimming) consists of a single long strip of material which is wound helically and has the contiguous edges of adjacent convolutions of the helix joined by a single continuous helical seam. If two or more strips are used they can first be joined edge-to-edge by continuous seams whereupon the composite strip thus formed is wound in a helix and edges of adjacent convolutions of the helix are joined by a single continuous seam.

The legs of pants-type garments and sleeves of dress-type garments (when sleeves are desired) are made in like manner by winding one or more strips of material helically and joining the contiguous edges of adjacent convolutions of the helix by a continuous seam. In the case of pants-type garments, upper end portions of the strips forming the respective legs are shaped so that when joined together by a central seam they form the top part of the garment.

In addition to simplifying the construction of garments, the present invention makes possible the production of garments of novel style and attractive appearance. The helical construction in itself imparts a distinctive appearance to the garment. In contrast with conventional garments in which all or most of the seams run either horizontally or vertically, the seams of garments made in accordance with the present invention run helically. Moreover if the garment is made of two or more long strips of material the strips can be of different fabrics or different patterns or textures thereby highlighting the effect created by the helical construction.

BRIEF DESCRIPTION OF DRAWINGS

The nature, objects and advantages of the invention will be more fully understood from the following description of preferred embodiments shown schematically by way of example in the accompanying drawings in which:

FIG. 1 shows an off-one-shoulder dress made of two long strips of material wound helically and having one sleeve;

FIG. 2 shows the two strips of material of which the dress of FIG. 1 is made;

FIG. 3 shows a strip of material from which the sleeve of the dress of FIG. 1 is made;

FIG. 4 shows an off-one-shoulder sleeveless dress of tapered construction;

FIG. 5 shows the two strips of material from which the dress of FIG. 4 is made;

FIG. 6 shows an off-the-shoulder one sleeve dress made from four strips of material;

FIG. 7 shows the four strips of material from which the dress of FIG. 6 is made;

FIG. 8 shows a strip of material from which the sleeve of the dress of FIG. 6 is made;

FIG. 9 shows a sleeveless dress made from a single strip of material wound helically;

FIG. 10 shows the single strip of material from which the dress of FIG. 9 is made;

FIG. 11 shows a sleeveless dress made from a single strip of material which is wider than the strip of FIG. 10;

FIG. 12 shows the single strip of material of which the dress of FIG. 11 is made;

FIG. 20 shows a dress formed of three squares which are joined with one another and then wound helically;

FIG. 21 shows the three squares of fabric of which the dress of FIG. 20 is made;

FIG. 22 shows four smaller squares from which each of the sleeves of the dress of FIG. 20 are made;

FIG. 23 shows pants made in accordance with the present invention with the legs of the pants spiralling in opposite directions;

FIGS. 24A and 24B shown composite strips of which the pants of FIG. 23 are made, each of the composite strips being formed of four narrow strips joined together;

FIG. 25 shows pants made in accordance with the present invention with the legs spiralling in the same direction;

FIGS. 26A and 26B shows composite strips of which the pants of FIG. 25 are made;

FIG. 27 is a fragmentary view illustrating an alternative construction and

FIGS. 28 and 29 are schematic cross sectional views illustrating alternative modes of joining adjacent strips of fabric.

DESCRIPTION OF PREFERRED EMBODIMENTS

Figure 13:
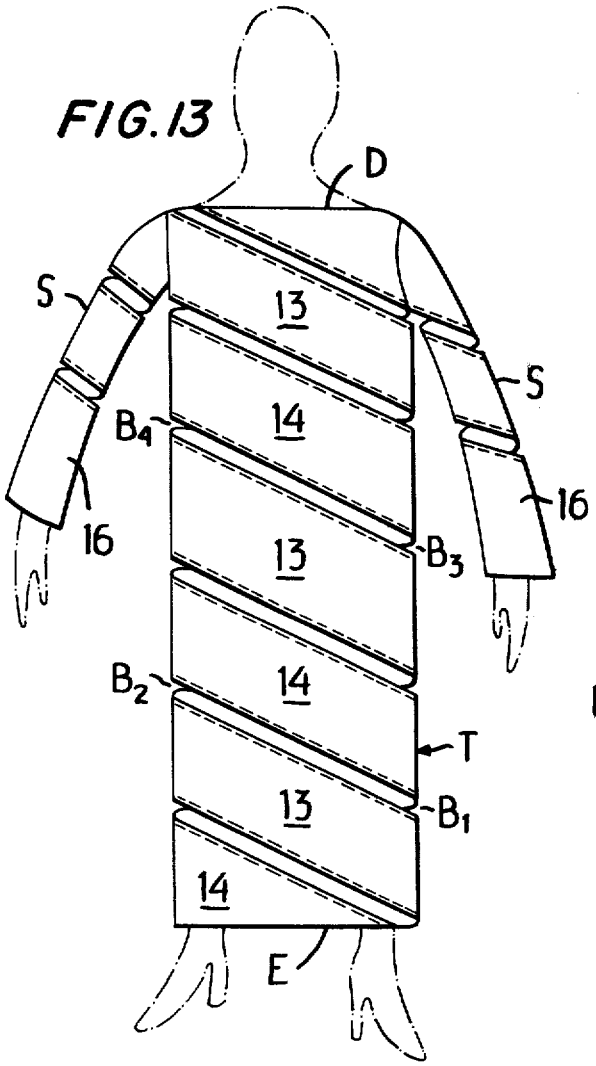
FIG. 13 is a dress made of two strips of material and having a square neck and two sleeves.

In FIG. 1 there is shown schematically a dress made in accordance with the present invention while FIGS. 2 and 3 show the three pieces of material from which the dress is made. The dress is shown as on off-one-shoulder style and comprises a body or torso portion T and a single sleeve S. The body portion of the dress is made of two strips of material 1 and 2 shown in FIG. 2. Each of the strips is approximately 8 inches wide. The dotted lines along the edges of the strips represent seam allowances. The length of the strips depends on the size of the dress and on the desired length. By way of example strip 1 is approximately 10 feet 6 inches long while strip 2 is approximately 8 feet 6 inches long. The strips are cut from woven, knitted or unwoven fabric suitable for the desired dress. Knitted fabric is particularly suitable by reason of its having a certain amount of elasticity. Near the top of strip 1 there is provided a curved cut-out C which provides the single armhole of the dress. The upper ends of the strips are cut obliquely to provide inclined edges D which form the top or neckline of the dress. The lower ends of the strip are also cut obliquely to provide inclined edges E which form the lower edge or hemline of the dress. It will be understood that edges D and E are suitably finished for example by hemming or rolling.

The dress is assembled by first joining the adjacent edges A of the two strips 1 and 2 in a continuous straight seam. The composite strip thus formed is then wound helically as illustrated in FIG. 1 and the edge B of strip 1 is joined with the edge B of strip 2. In order to position the edges B of the two strips correctly relative to one another, each of the edges is provided at proper intervals with small notches or other markings which are identified by way of example in the drawings as $B_1$, $B_2$, $B_3$ and $B_4$. In assembling the dress notch $B_1$ of strip 1 is made to coincide with notch $B_1$ of strip 2, notch $B_2$ of strip 1 is made to coincide with notch $B_2$ of strip 2, etc. The distance between notches $B_1$ and $B_2$ represents half of a turn or convolution of the helix in which the composite strip is wound. Thus the distance between the notches controls the size of the dress. For a smaller size dress the notches are closer together while for a larger size dress the notches are farther apart. It will be noted that the distance between the notches of strip 1 is the same as the distance between the notches of strip 2. Thus the edges of the strips are joined together without shirring, gathering or puckering. In order to illustrate the construction more clearly, the edges A of strips 1 and 2 are shown joined by a seam A in FIG. 1 while the edges B are not yet joined and are shown slightly spaced from one another. It will of course be understood that in the finished dress that the edges B are likewise joined by a continuous seam.

The single sleeve S of the dress shown in FIG. 1 is like the body portion, formed of a helically wound strip. The strip 3 which forms the sleeve is shown in FIG. 3. The side edges of the strip 3, instead of being straight throughout their length as are the edges of strips 1 and 2 shown in FIG. 2, are cut as shown in FIG. 3 in order to provide a certain amount of taper to the sleeve. Near its upper end the strip 3 is provided with a cut-out C having a curved edge which is joined with the edge C of strip 1 when the sleeve is set in the dress. The lower end of the strip 3 is cut at an angle to provide an oblique edge E which forms the lower end of the sleeve. In order to form the sleeve, the strip 3 is wound helically as indicated in FIG. 1 and the opposite edges of each convolution are joined to the contiguous edges of the preceding and succeeding convolutions. For the purpose of clearer illustration the edges B as shown in FIG. 1 are not joined but are shown slightly spaced from one another. It will be understood however that in the completed sleeve the edges B are joined by a continuous seam which extends helically around the sleeve. The tubular sleeve thus formed is then set in the armhole of the dress.

It will be appreciated that the construction in accordance with the present invention provides a novel and attractive dress style. The helical arrangement of the strips and the seams joining them in itself creates an unusual and attractive effect. Moreover this effect can be highlighted by cutting the strips 1 and 2 from different fabrics, for example fabrics of different pattern, color or texture.

In FIG. 4 there is shown a dress which is essentially the same as that of FIG. 1 except that the dress is sleeveless and is somewhat tapered so that the circumference at the bottom is greater than at the top. The dress is made of two long strips of fabric 4 and 5 which are shown in FIG. 5. It will be seen that the strips 4 and 5 instead of being straight are slightly zig-zag. Moreover since the distances between the notches $B_1$, $B_2$, $B_3$ and $B_4$ in the edges B of the strips represent half convolutions of the helix in which the strips are wound these distances have the relation $$B_1-B_2>B_2-B_3>B_3-B_4.$$

As in the case of the first embodiment the edges A of the two strips 4 and 5 are joined by a continuous seam and the composite strip thus formed is wound into a helix and the contiguous edges B of successive convolutions of the helix are joined by a continuous seam. For clarity of illustration in FIG. 4 the edges are not shown joined but slightly spaced from one another. Inclined edges D at the upper ends of the strips 4 and 5 from the top or neckline of the dress while inclined edges E at the lower ends of the strip form the bottom edge or hemline of the dress. A curved cut-out C near the upper end of strip 4 forms an armhole. It will be understood that the edges C, D and E are suitably finished. Moreover a sleeve can be fitted in the armhole C as in FIG. 1 if this is desired.

In FIG. 6 there is shown a dress which is essentially the same as that of FIG. 1 except that instead of being formed of two long strips of fabric it is formed of four strips 6, 7, 8 and 9 as illustrated in FIG. 7. By way of example each of the strips is approximately 4 inches wide and is provided with seam allowances as indicated by the dotted lines. In assembling the dress contiguous edges F of strips 6 and 7 are joined by a continuous seam to form a composite strip 6–7. Contiguous edges F of the other two strips 8 and 9 are likewise joined by a continuous seam to form a composite strip 8–9. Contiguous edges A of composite strips 6–7 and 8–9 are then joined by a continuous seam to form a composite strip 6–9 which is wound into the form of helix. In forming the helix, notches $B_1$–$B_4$ in the edge B of strip 6 are brought respectively into coincidence with notches $B_1$–$B_4$ in the edge B of strip 9. The contiguous edges B of successive convolutions of the composite strip 6–9 are thereupon joined by a continuous seam. For clarity of illustration the edges A and edges B are not shown joined in FIG. 6 but rather are slightly spaced. It will be understood however that such edges are joined in the completed garment. Inclined edges D at the upper ends of the strips 6–9 form the top or neckline of the dress while inclined edges E at the lower ends of the strips 6–9 form the bottom edge or hemline of the dress. A cut-out C near the upper end of the composite strip 6–7 forms an armhole to receive a sleeve formed of a strip 10 shown in FIG. 8. As described above with reference to FIG. 1, the strip 10 is wound helically so as to bring notches $B_1$ and $B_2$ of one edge into coincidence with corresponding notches of the other edge and the contiguous edges B of successive convolutions of the helix are joined by a continuous seam. The sleeve is then set into the armhole provided by the cut-out C in the composite strip 6–7.

Instead of the strips 6–9 being of equal width various combinations of strips of different widths can be used. For example strip 6 may be approximately 5 inches wide and strip 7 approximately 3 inches wide. Any other combination of widths totaling approximately 8 inches for the composite strip 6–7 can likewise be used. The same is true of the composite strip 8–9.

By reason of its being made of four long strips of material the dress construction illustrated by FIGS. 6–8 offers still greater possibility of novel and interesting combinations. For example each of the strips 6–9 can be of a different pattern, color or texture. Further interesting effects can be obtained by using strips of different widths.

In FIG. 9 there is shown a dress made of a single strip of fabric 11 which is illustrated in FIG. 10. By way of example the strip 11 is approximately 11 inches wide and approximately 18 feet 6 inches long. At its upper end the strip 11 is cut obliquely to provide an inclined edge D which forms the top or neckline of the dress T. At its lower end the strip 11 is likewise cut obliquely to provide an inclined edge E which forms the bottom or hemline of the dress. Near its upper end the strip 11 is provided with two cut-outs C which form the armholes of the dress. To form the dress, the strip 11 is wound into helical form so as to bring points $B_1$–$B_9$ on one edge of the strip into coincidence with points $B_1$–$B_9$ respectively on the opposite edge of the strip. Contiguous edges of adjacent convolutions of the strip are thereupon joined by a continuous seam. For clarity of illustration the edges are not shown joined in FIG. 9 but rather are shown slightly spaced. Although the dress is shown sleeveless it will be understood that sleeves can be set in the armholes provided by cut-outs C if desired.

In FIG. 11 there is shown a dress which is similar to that of FIG. 9 in that it is made of a single strip of material 12 which is shown in FIG. 12. However the strip 12 is wider and shorter than the strip 11 shown in FIG. 10. For example the strip of FIG. 12 is approximately 23 inches wide and approximately 10 feet 6 inches long. The upper end of the strip 12 is cut obliquely to provide an inclined edge D which forms the upper edge or neckline of the dress. The lower end of the strip 12 is likewise cut obliquely to provide an inclined edge E which is approximately parallel to the edge D. The edge E forms the lower edge or hemline of the dress. Near its upper end the strip 12 is formed with spaced cut-outs C which form armholes of the dress.

To form the dress shown in FIG. 11 from the strip of material shown in FIG. 12, the strip 12 is wound helically so as to bring points $B_1$–$B_3$ on one edge of the strip respectively into coincidence with the points $B_1$–$B_3$ on the opposite edge of the strip. The contiguous edges B of successive convolutions of the strip are thereupon joined by a continuous seam. For clarity of illustration the edges B of successive convolutions of the strip 12 are shown slightly spaced in FIG. 11. It will be understood however that in the completed dress the opposite edges B of the helically wound strip are joined by a continuous seam. However lower portions G of the side edges of the strip are not joined thereby forming a slit G at one side of the skirt portion of the dress. Although in FIG. 11 the dress is illustrated as being sleeveless, it will be understood that sleeves may be fitted to the armholes provided by cut-outs C. Such sleeves can be conventional but they are preferably formed by spirally wound strips as described above with reference to FIGS. 1 and 3.

Although the strip 12 shown in FIG. 12 is approximately twice as wide as the strip 11 shown in FIG. 10, it will be seen from FIG. 11 that when the strip 12 is wound into a helix to form the dress it makes more than one complete convolution. The narrower strip 11 shown in FIG. 10 makes more convolutions. It will be understood that strips of other widths between the 23 inch width of the strip shown in FIG. 12 and the 11 inch width of the strip shown in FIG. 10 can be used in carrying out the invention. The number of convolutions required in each instance depends on the width of the strip used and on the size and length of the dress.

In FIG. 13 there is shown a dress like that of FIG. 1 except that it has a square neckline D and two sleeves S. The dress shown in FIG. 13 is made of two strips of material 13 and 14 and a small additional piece 15. As in FIG. 2 the strips are shown as being approximately 8 inches wide. The small additional piece of fabric 15 corresponds in effect to an upper end portion of the strip 14. A portion of material of the same size and shape could if desired be provided at the upper end of the strip 14. However since the strip 14 in this case would be almost completely severed by a cut-out for one of the armholes of the dress, it has been found more convenient to use a separate small piece which is joined to an upper edge portion B of the strip 13. With this construction one armhole is formed by a cut-out C near the upper end of the strip 13 while the other armhole is provided by the curved edges $C_1$ and $C_2$ at the upper end of the strip 14 and on the separate piece 15 as shown. An inclined edge D at the upper end of the strip 13 and an aligned inclined edge D of the separate piece 15 form the neck opening of the dress. Inclined edges E at the lower ends of strips 13 and 14 form the lower edge or hemline of the dress.

The parts are assembled by joining an edge B of the extra piece 15 to an upper end portion of the edge B of strip 13 and joining edges A of strips 13 and 14 by a continuous seam to form a composite strip. The composite strip 13–14 is then wound into helical form to bring points $B_1$–$B_4$ on the edge B of strip 13 into coincidence with corresponding points $B_1$–$B_4$ respectively of strip 14. For clarity of illustration in FIG. 13 the edges A and edges B of the strips 13 are shown slightly spaced. However it will be understood that in the completed dress the edges A of strips 13 and 14 are joined by a continuous seam to form a composite strip and that contiguous edges B of successive convolutions of the helically wound composite strip are joined by a continuous seam.

Figure 15:
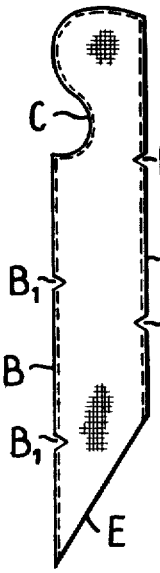
FIG. 15 shows a strip of material of which one sleeve is made, the other being made in like manner.

Each of the sleeves S of the dress shown in FIG. 13 is made of a strip of material 16 as illustrated in FIG. 15. To form the sleeve the strip is wound helically so as to bring points $B_1$ and $B_2$ on one edge of the strip into coincidence respectively with points $B_1$ and $B_2$ on the opposite edge of the strip whereupon contiguous edges of successive convolutions of the strip are joined by a continuous seam. The sleeves thus formed are set in the armholes provided in the body portion T of the dress.

Figure 14:
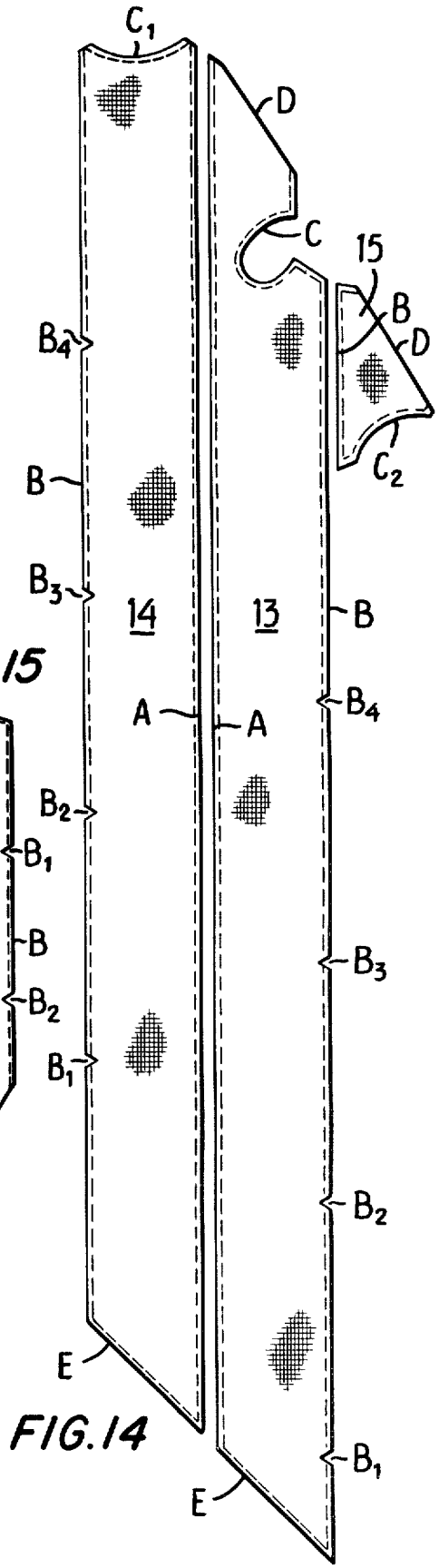
FIG. 14 shows the two strips and a small additional piece of which the dress of FIG. 13 -apart from the sleeves- is made.
Figure 16:
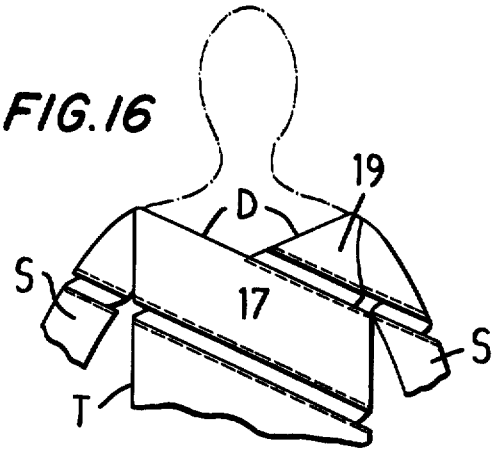
FIG. 16 shows the upper part of a dress having a V-shaped neckline.
Figure 17:
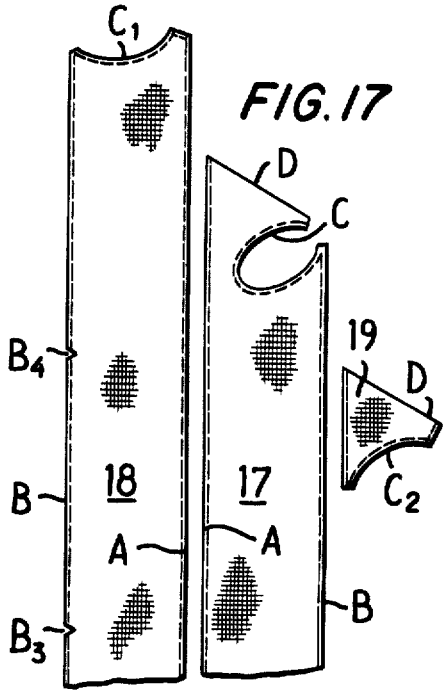
FIG. 17 shows the upper portions of strips cut to provide the neckline of FIG. 16.

The shape of the neckline of the dress can be varied as desired by appropriately shaping the upper end portions of the helically wound strips of which the dress is composed. Thus for example in FIG. 16 there is shown a dress with a V-shaped neckline D. The dress (apart from the sleeves) is formed of two strips of material 17 and 18 and an additional small piece of material 19 which is joined to an upper portion of the side edge B of strip 17. As the dress is the same as that of FIG. 13 except for the neckline, only the upper portion of the dress and the upper end portions of strips 17 and 18 are shown in FIGS. 16 and 17 respectively. A cut-out C near the upper end of the strip 17 forms one armhole of the dress while the other armhole is formed by curved surfaces $C_1$ and $C_2$ formed respectively at the upper end of the strip 18 and on the extra piece 19. The V-shaped neckline is formed by inclined edges D at the upper end of strip 17 and on the separate piece 19. The dress is assembled and the sleeves S are made and set in the armholes of the dress as described above with reference to FIGS. 13–15.

Figure 18:
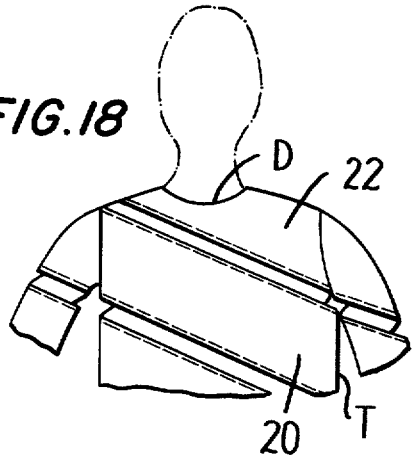
FIG. 18 shows the upper portion of a dress with a jewel neckline.
Figure 19:
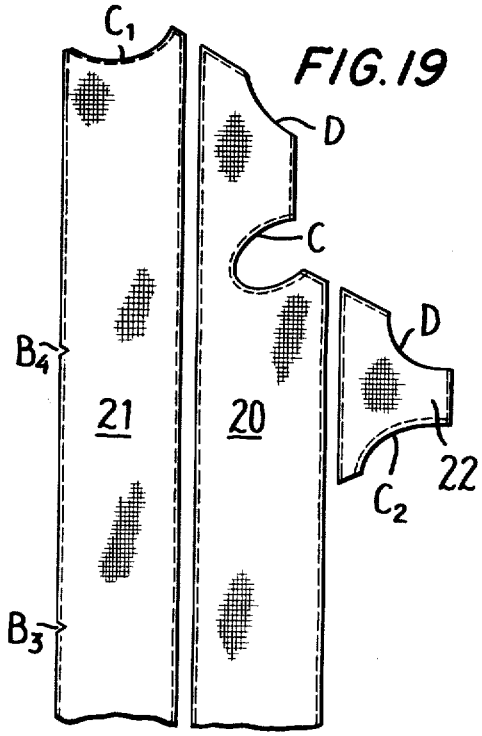
FIG. 19 shows the upper end portions of strips which are cut to provide the jewel neckline of FIG. 18.

Still another shape of neckline is illustrated in FIG. 18 where there is shown a dress T having a jewel neckline D. The dress of FIG. 18 (apart from the sleeves) is made from two long strips of material 20 and 21 and a small extra piece 22 as shown in FIG. 19. As the dress of FIG. 18 is the same as that of FIG. 13 except for the neckline, only the upper portion of the dress is shown in FIG. 18 and only the upper portions of strips 20 and 21 are shown in FIG. 19. The jewel neckline is provided by curved surfaces D at the upper end of the strip 20 and on the separate piece 22. A cut-out C near the upper end of the strip 20 forms one armhole while curved surfaces $C_1$ and $C_2$ provided respectively at the upper end of the strip 21 and on the separate piece 22 form the other armhole. The dress is assembled and the sleeves are made and set in as described above with reference to FIGS. 13 to 15.

While mid-length and long dresses have been shown by way of example in FIGS. 1, 4, 6, 9 and 13, it will be understood that a dress of any desired length may be made by appropriately selecting the length of the strip or strips from which the dress is formed. The construction illustrated in the drawings and described above is of course applicable not only to dresses but also to other dress-type garments such as coats, night dresses and hostess gowns. Moreover by the use of shorter strips, garments such as shirts, blouses and jackets can be made. Likewise by using only the lower portion of the illustrated construction it is possible to make skirts. For convenience of putting the garment on and taking it off, an appropriate cut or slit can be made in the garment and provided with a zipper or other type of closure.

*Whether the garment is longer or shorter, the helix defined by the helically wound strip should have a pitch of at least one complete convolution in a length of about thirty inches measured parallel to the axis of the helix. Preferably, even for shorter dress-type garments, the helically wound strip makes at least one complete convolution in the length of the garment.*

In FIG. 20 there is shown a dress which apart from the sleeves is made of three squares of material 23, 24 and 25 illustrated in FIG. 21. The squares are of equal size except that the upper right-hand corner of square 23, as shown in FIG. 21 is cut off along a line H inclined at an angle of 45° to the sides of the square. In the edge formed by the line H there are two curved cut-outs C which form the armholes of the dress. Contiguous edges $B_1$ of squares 23 and 24 are joined by a seam and likewise the opposite edge of $B_3$ of square 24 is joined to a contiguous edge $B_3$ of square 25 so as to form a rectangular strip having a length three time its width. For example, the width may be about 24 inches and the length 72 inches. The composite strip thus formed is wound into helical form and edge $B_2$ of square 23 is joined by a seam to edge $B_2$ of square 24 while edge $B_4$ of square 24 is joined to a contiguous edge $B_4$ of square 25. Thus adjacent edges $B_1$ and $B_2$ of the intermediate square 24 are joined respectively with adjacent $B_1$ and $B_2$ of square 23 while adjacent edges $B_3$ and $B_4$ of the intermediate square 24 are joined respectively with adjacent edges $B_3$ and $B_4$ of the square 25. The free edges E of square 25 form the bottom edge or hemline E of the dress shown in FIG. 20 while the free edges D of square 23 form the front of a V-shaped neck. The oblique edge H between armhole cut-outs C of square 23 forms the back of the neck.

Each of the sleeves S of the dress shown in FIG. 20 is made of four small squares of material 26–29. The squares 26–29 are joined along contiguous edges A to form a composite rectangular strip of material. The composite strip of material thus formed is coiled into the form of a helix so as to bring points $B_1$–$B_3$ on one side edge of the strip into coincidence with points $B_1$–$B_3$ on the opposite edge of the strip. Contiguous edges of successive convolutions of the composite strip are thereupon joined by a continuous seam to form the sleeve. Each of the sleeves thus formed is set into the respective armhole provided by cut-outs C in the square 23 shown in FIG. 21. The size of the squares 23–25 is selected so as to form a dress of the desired size. As opposite corners of square 24 come together at the back of the dress, it will be seen that the length of the diagonal of the square 24 is equal to the circumference of the dress.

The garment shown in FIG. 20 is susceptible of many modifications. For example the lower left part of square 25 bounded by the edges E, F may be cut off along the diagonal to make a shorter dress. If desired the garment can be cut off still shorter for use as a blouse, jacket or coat. Alternatively, the lower portions can be used as a shirt. The neckline can be varied by appropriately shaping the upper portion of square 23 similarly as described above with reference to FIGS. 1 to 19.

In FIG. 23 there is shown a pair of pants made in accordance to the present invention. The material of which the pants are made is shown in FIGS. 24A and 24B. The material for the [left] *right* leg and corresponding upper part of the pants is shown in FIG. 24A while the material for the [right] *left* leg and corresponding upper part is shown in FIG. 24B. It will be seen that the two legs and corresponding upper portions are identical with one another except that one is the reversal or mirror image of the other.

Each of the legs and corresponding upper portion of the pants is formed of four strips of material 31-34. The strips are disposed along side one another and contiguous edges A of adjacent strips are joined by seams to form a composite strip 31-34. The lower edge of the composite strip is cut at an angle to provide an inclined edge E which forms the bottom edge of the pants leg. At its upper end the composite strip has an upwardly inclined end edge $I_1$ which extends across strip 34 and a portion of strip 33. A downwardly inclined edge K extends across the balance of strip 33 and across strips 32 and 31. In the inner edge of the composite strip as viewed in FIGS. 24A and 24B just below the inclined end edge K there is provided an inclined cut-out having an upper edge J and a lower edge $I_2$.

After the strips are assembled as shown in FIGS. 24A and 24B, the composite strip which is to form each leg is wound into the form of a helix so as to bring points $B_1$-$B_3$ on one edge B of the composite strip into coincidence with corresponding points $B_1$-$B_3$ respectively on the opposite edge of the composite strip. Contiguous edges B of successive convolutions of the helix thus formed are joined by a continuous seam to form the corresponding leg of the pants.

In order to join the two legs of the pants, the edge J of one leg is joined with the edge J of the other leg to form a front central seam J as shown in FIG. 23. The edge $I_2$ of one leg is joined with the corresponding edge $I_2$ of the other leg to form a portion of a central back seam while edges $I_1$ of the two legs are joined with one another to form a continuation of the back central seam. The edges K of the two legs form the upper edge or waist of the pants. It will be understood that the upper edge can be provided with a waistband or otherwise finished as desired. In order to shape the waist, the upper portions of the seams joining the contiguous edges A of strips 32, 33 and 34 can be tapered in as illustrated at L. It will be understood that an opening with suitable zipper or other closure can be provided either between edges J or at the side or back of the pants as desired.

While each of the pants legs as shown is shown as being made of four strips of equal width it will be understood that strips of different widths may be used and also that the number of strips can be varied so long as the width between the side edges B of the leg portions is correct for the type of pants to be made. Moreover it will be understood that the pants construction as illustrated and described is applicable to other pants-type garments such as slacks, jeans [and], coulottes *and shorts* . The material used is selected so as to be appropriate for the type of garment being made. When each of the pants legs is made of plurality of strips of material as illustrated many different styling effects can be obtained by selection of the material used for the respective strips. Thus the strips can, if desired, be made of different pattern, color or texture.

In FIG. 25 there is shown a pair of pants which differs from the pants shown in FIG. 23 in that the strips forming the two legs of the pants in FIG. 25 spiral in the same direction as in the pants of FIG. 23 the strips forming two legs spiral in opposite directions. The material for making the right and the left legs of the pants of FIG. 25 is shown respectively in FIGS. 26A and 26B. The material for each of the legs is shown as comprising four strips of material 31-34 which are disposed side by side with contiguous edges A joined by seams. The composite strip 31-34 for the left leg of the pants as shown in FIG. 26A is similar to but not identical with the composite strip of material 31-34 for the right leg as shown in FIG. 26B. The lower end of each of the composite strips has a lower edge E which is inclined at an angle of about 45° to the side edges. This edge forms the bottom of the respective pants leg. At its upper end the composite strip of FIG. 26A has an upwardly inclined edge $M_1$ which extends across the strip 34 and a portion of the strip 33. A downwardly inclined edge K extends across the balance of strip 33 and across strips 32 and 31. In the right-hand side edge B as viewed in FIG. 26A just below the inclined edge K there is provided a downwardly inclined cut-out having an upper edge N and a lower edge $M_2$.

Like the composite strip of FIG. 26A that of FIG. 26B has an inclined lower edge E. At its upper end the composite strip of FIG. 26B has an upwardly inclined edge $N_1$ which extends part way across the left-hand strip 34. A downwardly inclined edge K extends across the balance of the strip 34 and across the strips 33, 32 and 31. In its right-hand edge B just below the inclined edge K the composite strip of FIG. 26B is formed with a downwardly inclined cut-out having an upper edge M and a lower edge $N_2$.

In assembling the pants each of the composite strips 31-34 is coiled into the form of a helix so as to bring points $B_1$-$B_3$ on one edge of the composite strip into coincidence with correspondings points $B_1$-$B_3$ respectively on the opposite edge of the composite strip. Contiguous edges of successive convolutions of the composite strip are thereupon joined with a continuous seam. For clearer illustration in FIG. 25 the edges B of the composite strip are shown slightly spaced. However it will be understood that in the completed garment these edges are joined by a seam. The two pants legs thus formed are united by joining the edge N of the [left] *right* leg shown in FIG. 26A with the edges $N_1$ and $N_2$ of the [right] *left* leg as shown in FIG. 26B, the edge $N_2$ forming a continuation of the edge $N_1$. This forms a front central seam of the pants. Edge M of the [right] *left* leg shown in FIG. 26B is joined with edges $M_1$ and $M_2$ of the [left] *right* leg as shown in FIG. 26A to form a back central seam of the pants, the edge $M_2$ forming a continuation of the edge $M_1$. The inclined edges K form the top edge or waist of the pants and may be finished by a waistband or otherwise as desired. Upper end portions of the seams joining contiguous edges A of strips 31, 32, 33 and 34 are preferably tapered inwardly as indicated at L in order to shape the waist. It will be understood that an opening with a zipper or other closure can be provided either at the center at the front of the pants or in another location as desired.

By reason of the strips of the two legs of the pants spiralling in the same direction the construction illustrated in FIG. 25 is an interesting variation of that shown in FIG. 23. It will be understood that as described above the number of strips and the width of the strips can be varied to provide different effects and likewise the strips can be made of different fabrics or of fabrics of different pattern, color or texture. The construction as shown in FIG. 25 is likewise applicable to different pants-type garments such as coulottes, slacks, jeans and shorts.

The novel construction in accordance with the present invention lends itself to many variations and modifications of which examples are further illustrated in FIGS. 27 to 29. In FIG. 27 there is shown a portion of an assembly of strips of material corresponding in general to the strips shown in FIGS. 7, 24A and B and 26A and B. However instead of four 4 inch strips the assembly of FIG. 27 is shown as comprising four 3 inch strips 35 alternating with four 1 inch strips 36. The strips 36 can conveniently be made of braid, ribbon, mesh, netting, lace or elastic. For example a helical stripe effect can be obtained by using braid or ribbon of selected color. Lace, mesh or netting can be used to provide a selected "see-through" effect. The use of elastic fabric is particularly interesting since it provides the garment with elasticity allowing it to conform to the contour of the wearer. While one example has been illustrated in FIG. 27, it will be understood that the number, widths and material of the strips can be selected to achieve a wide variety of styles and effects.

By making garments of one or more long strips of material instead of from pieces of various sizes and shapes, the construction of the present invention makes possible important economies especially in commercial production. As material can be obtained from the supplier in strip form of desired widths no cutting is required except at the ends of the strips. As opposite ends of the strips are generally at least approximately parallel to one another there is virtually no waste. The strip material can be produced either by cutting wider material, for example in bolt form or by knitting or weaving the material as narrow fabric of selected width. The use of narrow fabric is especially advantageous in that the fabric has finished edges which facilitates the joining of the strips.

Two methods of joining are illustrated by way of example in FIGS. 28 and 29. In FIG. 28 two strips of narrow fabric 37 and 38 have their finished edges butting one another and are joined by a elastic strip 39 which is stitched to the fabric strips 37 and 38 by stitching 40. The elastic 39 joining the strips 37 and 38 imparts a certain amount of elasticity to the garment. The amount of elasticity can be controlled by selection of the elastic strip 39 and by the spacing of the stitching 40 from the normally abutting edges of the strips 37 and 38.

A further construction is illustrated in FIG. 29 where two strips of fabric 41 and 42 have their adjacent edges spaced apart and are joined by a strip of elastic fabric 43 which is stitched to the strips 41 and 42 by stitching 44. Strips 41 and 42 are shown as having their edges 41a and 42a turned under. However if narrow fabric having finished edges is used, it is not necessary to turn the edges under. The elastic fabric 43 joining the strips 41 and 42 imparts a selected amount of elasticity to the garment. The spacing between the edges of strips 41 and 42 is selected as desired. Moreover it will be understood that turned under edges as shown in FIG. 29 can be made to abut one another as shown in FIG. 28 if desired. It will be understood that the method of joining illustrated in FIGS. 28 and 29 is applicable to joining "A", "B" and "F" edges of the various embodiments illustrated in FIGS. 1 to 26B.

While preferred embodiments of the invention have been illustrated in the drawings and are herein particularly described it will be understood that the garment construction in accordance with the present invention is susceptible of many variations to obtain different styling and different effect and that the invention is thus in no way limited to the particular embodiments shown in the drawings and described in the specification.

What I claim is:

1. A dress-type garment comprising a body portion formed essentially of an elongate strip of fabric material helically wound about an axis, said strip having a width between approximately eleven inches and twenty-four inches and making at least one complete convolution in a length of about thirty inches measured parallel to said axis and means securing substantially equal lengths of the edges of adjacent convolutions of said [strips] *strip* together to form a continuous generally cylindrical body.

2. A dress-type garment according to claim 1, in which one end of said strip is cut at an angle to the length of the strip and is provided with excisions for armholes while the opposite end of said strip is cut approximately parallel the said one end.

3. A dress-type garment according to claim 1, in which said garment has at least one sleeve formed of a strip of fabric material helically wound about an axis and means joining edges of adjacent convolutions of said strip to form a tubular sleeve.

4. A dress-type garment comprising a body portion formed essentially of two strips of fabric material helically wound about an axis with convolutions of one of said strips alternating with convolutions of the other of said strips and means securing edges of one of said strips to edges of the other of said strips along helical junction lines to form a continuous generally cylindrical body.

5. A dress-type garment according to claim 4, in which said garment further comprises at least one sleeve formed of a strip of material helically wound about an axis and means of joining edges of adjacent convolutions of said strip along a helical junction line to form a tubular sleeve.

6. A dress-type garment according to claim 4, in which one end of each of said strips is shaped to provide a square neckline for said garment.

7. A dress-type garment according to claim 4, in which one end of each of said strips is shaped to provide a V-shaped neckline.

8. A dress-type garment according to claim 4, in which one end of each of said strips is shaped to provide a jewel neckline.

9. A dress-type garment comprising a body portion formed essentially of a plurality of strips of fabric material wound helically about an axis with convolutions of each of said strips disposed between convolutions of another of said strips and means joining edges of adjacent convolutions of said strips along helical junction lines to form a continuous generally cylindrical body.

10. A pants-type garment comprising two bands of material each of which is wound helically to form a leg of said garment, means *joining edges* of adjacent convolutions of said bands, upper end portions of said bands being shaped to form a body portion and means joining an upper portion of one of said bands [with an upper portion of one of said bands] with an upper end portion of the other of said bands along a central junction line.

11. A pants-type garment according to claim 10, in which the band forming one leg is wound helically in the opposite direction to the helical winding of the band forming the other leg of said garment.

12. A pants-type garment according to claim 10, in which the band forming one leg is wound helically in the same direction as the helical winding of the other leg of the garment.

13. A pants-type garment according to claim 10, in which each of said bands comprises a plurality of strips of material joined edge-to-edge along junction lines extending lengthwise of said bands.

14. A dress-type garment comprising a body portion formed essentially of first, second and third squares of fabric material each of which is disposed with one diagonal vertical and the other diagonal horizontal, means joining two adjacent edges of said second square respectively with two adjacent edges of said first square and means joining the remaining two adjacent edges of said second square respectively with two adjacent edges of said third square, a corner portion of said first square between its unjoined edges being shaped to provide a neckline and armholes.

15. A dress-type garment according to claim 14, in which said garment further comprises at least one sleeve formed of at least three squares of fabric material namely two end squares and at least one intermediate square having two adjacent side edges joined respectively with two adjacent side edges of a preceeding square and the other two adjacent side edges joined respectively with two adjacent side edges of a succeeding square, the junction lines of said squares extending helically of said sleeve.

16. A dress-type garment according to claim 9, in which at least one of said strips of fabric material is elastic.

17. A pants-type garment according to claim 13, in which at least one of said strips of material is elastic.

*18. A dress-type garment comprising a body-covering portion formed essentially of an elongate strip of fabric material helically wound about an axis with a pitch of at least one complete convolution in a length of about thirty inches measured parallel to said axis, and means securing substantially equal lengths of the edges of adjacent convolutions of said strip together to form a continuous, generally cylindrical body.*

*19. A dress-type garment comprising a body-covering portion formed essentially of an elongate strip of fabric material helically wound about an axis with edges of adjacent convolutions contiguous with one another, and means securing substantially equal lengths of the edges of adjacent convolutions of said strip together to form a continuous, generally cylindrical body.*

*20. A dress type garment according to claims 18 or 19, in which said helically wound strip makes at least one complete convolution in the length of the garment.*

* * * * *